(12) United States Patent
Cheng et al.

(10) Patent No.: US 6,868,115 B1
(45) Date of Patent: Mar. 15, 2005

(54) ALL-LAG SPREAD-SPECTRUM CORRELATOR

(75) Inventors: Chin Long Cheng, Hong Kong (HK); Tung Sang Ng, Pokfulam (HK); Kun Wah Yip, Ping Shek Estate (HK)

(73) Assignee: University of Hong Kong, Hong Kong (HK)

( * ) Notice: Subject to any disclaimer, the term of this patent is extended or adjusted under 35 U.S.C. 154(b) by 677 days.

(21) Appl. No.: 09/607,649

(22) Filed: Jun. 30, 2000

Related U.S. Application Data (60) Provisional application No. 60/141,777, filed on Jun. 30, 1999, and provisional application No. 60/141,732, filed on Jun. 30, 1999.

(51) Int. Cl.[7] ............................................. H04B 1/69
(52) U.S. Cl. ........................ 375/150; 375/142; 375/147
(58) Field of Search ............................ 375/150, 130, 375/147, 149, 142, 143, 145, 152, 342, 136, 140, 141, 153

(56) References Cited

U.S. PATENT DOCUMENTS

| | | | |
|---|---|---|---|
| 5,022,047 A | | 6/1991 | Dixon et al. |
| 6,198,765 B1 | | 3/2001 | Cahn et al. |
| 6,208,291 B1 | | 3/2001 | Krasner |
| 6,289,041 B1 | * | 9/2001 | Krasner ..................... 375/152 |
| 6,330,292 B1 | * | 12/2001 | Dent et al. .................. 375/343 |
| 6,611,512 B1 | * | 8/2003 | Burns ......................... 370/342 |

* cited by examiner

*Primary Examiner*—Young T. Tse
*Assistant Examiner*—Sam K. Ahn
(74) *Attorney, Agent, or Firm*—Jones Day (57) ABSTRACT

An all-lag correlator is provided that correlates a received spread-spectrum signal with a reference code and produces at each sampling instance N correlation lags corresponding to the correlation of the received signal with 0, 1, ..., N−1 lags (or delays) of the reference code, wherein N is the length of the reference code. The correlator includes a spread spectrum signal storage means, subtraction means, multiplication means, correlation lag storage means and addition means configured such that a correlation lag for a present sampling instance is based on a correlation lag of a previous sampling instance.

11 Claims, 5 Drawing Sheets

ALL-LAG SPREAD-SPECTRUM CORRELATOR

CROSS REFERENCE TO RELATED APPLICATIONS

This application is related to and claims priority to the following applications: U.S. Provisional Application No. 60/141,777, filed on Jun. 30, 1999; and U.S. patent application Ser. No. 09/607,649, filed on Jun. 30, 2000, which claims the benefit of U.S. Provisional Application No. 60/141,732, filed on Jun. 30, 1999.

BACKGROUND

1. Field of the Invention

The present invention generally relates to spread-spectrum (SS) systems. In particular, the present invention relates to systems, methods and apparatus for correlating a received SS signal with all lags of a reference code sequence and producing all correlation lags at a sampling instant.

2. Description of the Related Art

SS techniques have applications in many areas such as secure communications, multiple-access communications, channel sounding, ranging and target identification using radars and sonars, and navigation using Global Positioning System (GPS) or GLONASS. One of the essential elements in the implementation of a SS receiver is a correlator. A correlator is required at the receiver to initially acquire or code-align the incoming SS signal with the pseudo-noise (PN) sequence that is identical to the one used at the transmitter side to spread the signal. A correlator is also used to perform other functions such as code tracking, symbol and carrier recovery, demodulation of information symbols embedded in the SS signal, and channel estimation. A correlator correlates a sequence of N samples in a stream of incoming SS signal samples $\{d_n\}$ with a code sequence $\{c_0, c_1, \ldots, c_{N-1}\}$, where N is the length of the code sequence, and generates a correlation result $$u_n = c_0 d_{n-(N-1)} + c_1 d_{n-(N-2)} + c_2 d_{n-(n-3)} \cdots + c_{N-2} d_{n-1} + c_{N-1} d_n \quad (1)$$

at the nth sampling instant. Herein the code sequence is referred to as a reference code. The reference-code length N is normally selected such that it is equal to the length of the PN sequence that is used to spread the SS signal, L, multiplied by the number of samples per chip, K, where K is a positive integer.

A serial correlator generates correlation values at a rate equal to one per N signal samples. That is, a serial correlator generates . . . , $u_{-2N}$, $u_{-N}$, $u_0$, $u_N$, $u_{2N}$, . . . . It is possible that the incoming signal samples are not code-aligned with the reference code. There is then a (time) lag between the incoming signal samples and the reference code. A serial correlator can only generate a correlation value at a particular lag. This correlation value is herein referred to as a correlation lag. Computation of a different correlation lag requires shifting or delaying/advancing the incoming signal. A parallel correlator, on the other hand, generates correlation lags at a rate equal to the rate of the incoming signal samples. Since the reference-code length is N, it is required to compute N correlation values corresponding to correlating the signal with 0, 1, . . . , N−1 lags of the reference code. A parallel correlator is therefore required to compute N correlation lags, given by $$u_n = c_0 d_{n-(N-1)} + c_1 d_{n-(N-2)} + c_2 d_{n-(N-3)} + \cdots + c_{N-2} d_{n-1} + \quad (2)$$
$$c_{N-1} d_n$$
$$u_{n+1} = c_0 d_{n-(N-2)} + c_1 d_{n-(N-3)} + c_2 d_{n-(N-4)} + \cdots + c_{N-2} d_n +$$
$$c_{N-1} d_{n+1}$$
$$u_{n+2} = c_0 d_{n-(N-3)} + c_1 d_{n-(N-4)} + c_2 d_{n-(N-5)} + \cdots + c_{N-2} d_{n+1} +$$
$$c_{N-1} d_{n+2}$$
$$\vdots$$
$$u_{n+N-2} = c_0 d_{n-1} + c_1 d_n + c_2 d_{n+1} + \cdots + c_{N-2} d_{n+N-3} + c_{N-1} d_{n+N-2}$$
$$u_{n+N-1} = c_0 d_n + c_1 d_{n+1} + c_2 d_{n+2} + \cdots + c_{N-2} d_{n+N-2} + c_{N-1} d_{n+N-1},$$

over a duration of N consecutive sampling intervals.

If the SS signal under consideration is a signal generated by means of periodic repetition of a PN sequence without data modulation, then the intended information obtained in the sample $d_{n+1}$ is also contained in $d_{n-(N-1)}$. Similarly, the information contained in $d_{n+2}$, $d_{n+3}$, . . . , $d_{n+N-1}$ is also contained in $d_{n-(N-2)}$, $d_{n-(N-3)}$, . . . , $d_{n-1}$. Thus, equation (2) can be equivalently expressed as $$u_n = c_0 d_{n-(N-1)} + c_1 d_{n-(N-2)} + c_2 d_{n-(N-3)} + \cdots + c_{N-2} d_{n-1} + \quad (3)$$
$$c_{N-1} d_n$$
$$u_{n+1} = c_0 d_{n-(N-2)} + c_1 d_{n-(N-3)} + c_2 d_{n-(N-4)} + \cdots + c_{N-2} d_n +$$
$$c_{N-1} d_{n-(N-1)}$$
$$u_{n+2} = c_0 d_{n-(N-3)} + c_1 d_{n-(N-4)} + c_2 d_{n-(N-5)} + \cdots + c_{N-2} d_{n-(N-1)} +$$
$$c_{N-1} d_{n-(N-2)}$$
$$\vdots$$
$$u_{n+N-2} = c_0 d_{n-1} + c_1 d_n + c_2 d_{n+(N-1)} + \cdots + c_{N-2} d_{n-3} + c_{N-1} d_{n-2}$$
$$u_{n+N-1} = c_0 d_n + c_1 d_{n-(N-1)} + c_2 d_{n-(N-2)} + \cdots + c_{N-2} d_{n-2} + c_{N-1} d_{n-1}.$$

Thus, computation of $u_n$, $u_{n+1}$, . . . , $u_{n+N-1}$ is equivalent to computing $r_n = [r_{0,n}, r_{1,n}, \ldots, r_{N-1,n}]^T$ from a block of data samples $d_n$, $d_{n-1}$, . . . , $d_{n-(N-1)}$, where $$\begin{bmatrix} r_{0,n} \\ r_{1,n} \\ r_{2,n} \\ \vdots \\ r_{N-2,n} \\ r_{N-1,n} \end{bmatrix} = \begin{bmatrix} c_0 & c_1 & c_2 & \cdots & c_{N-2} & c_{N-1} \\ c_{N-1} & c_0 & c_1 & \cdots & c_{N-3} & c_{N-2} \\ c_{N-2} & c_{N-1} & c_0 & \cdots & c_{N-4} & c_{N-4} \\ \vdots & \vdots & \vdots & \ddots & \vdots & \vdots \\ c_2 & c_3 & c_4 & \cdots & c_0 & c_1 \\ c_1 & c_2 & c_3 & \cdots & c_{N-1} & c_0 \end{bmatrix} \begin{bmatrix} d_{n-(N-1)} \\ d_{n-(N-2)} \\ d_{n-(N-3)} \\ \vdots \\ d_{n-1} \\ d_n \end{bmatrix}. \quad (4)$$

Thus, $r_n$ is a set of correlations for all lags or simply a set of all correlation lags.

The sequence of sets of all correlation lags, $\{r_n\}$, is generated at a rate equal to the rate of incoming SS signal samples $\{d_n\}$. It is obvious that a means for generating an all-lag correlation sequence can be implemented by means of N parallel correlators each of which correlates SS signal samples with the reference code at a given lag. However, none of the prior art teaches or suggests a method or apparatus for correlating a received SS signal with a reference code using a single correlator (a) which has the number of outputs equal to the length of the reference code and (b) whose outputs at one sampling instant are all correlation lags for the incoming SS signal samples and are produced at a rate equal to the rate of the incoming SS signal samples.

For example, the SS signal under consideration could be a signal composed by means of modulating data with the entirety of a PN sequence. When successive data symbols contained in signal samples $d_{n-(N-1)}$, $d_{n-(N-2)}$, ..., $d_{n+N-1}$ have the same sign, the intended information obtained in the sample $d_{n+1}$ is also contained in $d_{n-(N-1)}$. Similarly, the information contained in $d_{n+2}$, $d_{n+3}$, ..., $d_{n+N-1}$ is also contained in $d_{n-(N-2)}$, $d_{n-(N-3)}$, ..., $d_{n-1}$. Thus, equation (2) can be equivalently expressed as $$u_n = c_0 d_{n-(N-1)} + c_1 d_{n-(N-2)} + c_2 d_{n-(N-3)} + \cdots + c_{N-2} d_{n-1} + c_{N-1} d_n \quad (5)$$

$$u_{n+1} = c_0 d_{n-(N-2)} + c_1 d_{n-(N-3)} + c_2 d_{n-(N-4)} + \cdots + c_{N-2} d_n + c_{N-1} d_{n-(N-1)}$$

$$u_{n+2} = c_0 d_{n-(N-3)} + c_1 d_{n-(N-4)} + c_2 d_{n-(N-5)} + \cdots + c_{N-2} d_{n-(N-1)} + c_{N-1} d_{n-(N-2)}$$

$$\vdots$$

$$u_{n+N-2} = c_0 d_{n-1} + c_1 d_n + c_2 d_{n+(N-1)} + \cdots + c_{N-2} d_{n-3} + c_{N-1} d_{n-2}$$

$$u_{n+N-1} = c_0 d_n + c_1 d_{n-(N-1)} + c_2 d_{n-(N-2)} + \cdots + c_{N-2} d_{n-2} + c_{N-1} d_{n-1},$$

which is the same as equation (3). When successive data symbols contained in signal samples $d_{n-(N-1)}$, $d_{n-(N-2)}$, ..., $d_{n+N-1}$ have opposite sign, the intended information obtained in the sample $d_{n+1}$ is also contained in $-d_{n-(N-1)}$. Similarly, the information contained in $d_{n+2}$, $d_{n+3}$, ..., $d_{n+N-1}$ is also contained in $-d_{n-(N-2)}$, $-d_{n-(N-3)}$, ..., $-d_{n-1}$. Thus, equation (2) becomes $$u_n = c_0 d_{n-(N-1)} + c_1 d_{n-(N-2)} + c_2 d_{n-(N-3)} + \cdots + c_{N-2} d_{n-1} + c_{N-1} d_n \quad (6)$$

$$u_{n+1} = c_0 d_{n-(N-2)} + c_1 d_{n-(N-3)} + c_2 d_{n-(N-4)} + \cdots + c_{N-2} d_n - c_{N-1} d_{n-(N-1)}$$

$$u_{n+2} = c_0 d_{n-(N-3)} + c_1 d_{n-(N-4)} + c_2 d_{n-(N-5)} + \cdots - c_{N-2} d_{n-(N-1)} - c_{N-1} d_{n-(N-2)}$$

$$\vdots$$

$$u_{n+N-2} = c_0 d_{n-1} + c_1 d_n - c_2 d_{n+(N-1)} + \cdots - c_{N-2} d_{n-3} - c_{N-1} d_{n-2}$$

$$u_{n+N-1} = c_0 d_n + c_1 d_{n-(N-1)} - c_2 d_{n-(N-2)} + \cdots - c_{N-2} d_{n-2} - c_{N-1} d_{n-1}.$$

Based on equations (5) and (6), it is clear that computation of $u_n$, $u_{n+1}$, ..., $u_{n+(N-1)}$ is equivalent to computing $r_n = [r_{0,n}, r_{1,n}, \ldots, r_{N-1,n}]^T$ and $s_n = [s_{0,n}, s_{1,n}, \ldots, s_{N-1,n}]^T$ from a block of data samples $d_n$, $d_{n-1}$, ..., $d_{n-(N-1)}$, where $$\begin{bmatrix} r_{0,n} \\ r_{1,n} \\ r_{2,n} \\ \vdots \\ r_{N-2,n} \\ r_{N-1,n} \end{bmatrix} = \begin{bmatrix} c_0 & c_1 & c_2 & \cdots & c_{N-2} & c_{N-1} \\ c_{N-1} & c_0 & c_1 & \cdots & c_{N-3} & c_{N-2} \\ c_{N-2} & c_{N-1} & c_0 & \cdots & c_{N-4} & c_{N-4} \\ \vdots & \vdots & \vdots & \ddots & \vdots & \vdots \\ c_2 & c_3 & c_4 & \cdots & c_0 & c_1 \\ c_1 & c_2 & c_3 & \cdots & c_{N-1} & c_0 \end{bmatrix} \begin{bmatrix} d_{n-(N-1)} \\ d_{n-(N-2)} \\ d_{n-(N-3)} \\ \vdots \\ d_{n-1} \\ d_n \end{bmatrix}, \text{ and} \quad (7)$$

$$\begin{bmatrix} s_{0,n} \\ s_{1,n} \\ s_{2,n} \\ \vdots \\ s_{N-2,n} \\ s_{N-1,n} \end{bmatrix} = \begin{bmatrix} c_0 & c_1 & c_2 & \cdots & c_{N-2} & c_{N-1} \\ -c_{N-1} & c_0 & c_1 & \cdots & c_{N-3} & c_{N-2} \\ -c_{N-2} & -c_{N-1} & c_0 & \cdots & c_{N-4} & c_{N-4} \\ \vdots & \vdots & \vdots & \ddots & \vdots & \vdots \\ -c_2 & -c_3 & -c_4 & \cdots & c_0 & c_1 \\ -c_1 & -c_2 & -c_3 & \cdots & -c_{N-1} & c_0 \end{bmatrix} \begin{bmatrix} d_{n-(N-1)} \\ d_{n-(N-2)} \\ d_{n-(N-3)} \\ \vdots \\ d_{n-1} \\ d_n \end{bmatrix}. \quad (8)$$

Equation (7) is the same as equation (4). The all-lag correlation $r_n$ is thus a set of even correlations for all lags and $s_n$ is thus a set of odd correlations for all lags.

The sequence of sets of all even-correlation lags, $\{r_n\}$, and the sequence of sets of all odd-correlation lags, $\{s_n\}$, are generated at a rate equal to the rate of incoming SS signal samples $\{d_n\}$. It is obvious that a means for generating an all-lag even-correlation sequence can be implemented by means of N parallel correlators each of which correlates SS signal samples with the reference code at a given lag. It is also obvious that a means for generating an all-lag odd-correlation sequence can be implemented by means of N parallel correlators each of which correlates SS signal samples with a sequence specified by a row of the square matrix in equation (8).

None of the prior art, however, teaches or suggests a method or apparatus for correlating a received SS signal with a reference code using a single correlator (a) which has the number of outputs equal to the length of the reference code and (b) whose outputs at one sampling instant are all even-correlation lags for the incoming SS signal samples and are produced at a rate equal to the rate of the incoming SS signal samples. In addition, none of the prior art teaches or suggests a method or apparatus for correlating a received SS signal with a reference code using a single correlator (a) which has the number of outputs equal to the length of the reference code and (b) whose outputs at one sampling instant are all odd-correlation lags for the incoming SS signal samples and are produced at a rate equal to the rate of the incoming SS signal samples.

SUMMARY OF THE INVENTION

A first object of the invention is to provide a method and an apparatus using a single correlator for computing or generating all N correlation lags between a reference code and a received SS signal. The SS signal is a signal, possibly corrupted by noise and interference, composed by means of periodic repetition of a PN sequence. The correlator has N outputs and generates all N correlation lags once every sampling instant. Such anapparatus can be used for SS systems empoloying, for example, binary-phase-shift-keying (BPSK) signals, or code-phase-shift-keying (CPSK) signals, all without data modulation.

A second object of the invention is to provide an apparatus, using a plurality of correlators, for correlating a plurality of streams of SS signal samples with a reference code, The plurality streams of SS signal samples are generated from a received SS signal, which is a signal, possibly corrupted by noise and interference, composed by means of periodic repetition of a PN sequence. Each of the correlators has N outputs and generates all N correlation lags once every sampling instant. Such an apparatus can be used for SS systems empoloying, for example, BPSK signals, quadrature-phase-shift-keyed (QPSK) signals, multicarrier BPSK signals, multicarrier QPSK signals, or CPSK signals, all without data modulation embedded therein.

A third object of the invention is to provide a method and an apparatus, using a combination of an even-correlation-lag generator and an odd-correlation-lag generator, for computing or generating all N even- and odd-correlation lags between a reference code and a received SS signal. The received SS signal is a signal composed by modulating data with the entirety of a PN sequence. The even-correlation-lag generator has N outputs and generates N even-correlation lags once every sampling instant. The odd-correlation-lag generator has N outputs and generates N odd-correlation lags once every sampling instant. Such an apparatus can be used for SS systems empoloying, for example, BPSK signals, or CPSK signals, all with data modulation embedded therein.

A fourth object of the invention is to provide an apparatus, using a plurality of sub-apparatuses each of which is a combination of an even-correlation-lag generator and an odd-correlation-lag generator, for correlating a plurality of streams of SS signal samples with a reference and producing for each of the plurality of streams of SS signal samples all N even- and odd-correlation lags once every sampling instant. The plurality of streams of SS signal samples are generated from a received SS signal, which is a signal, possibly corrupted by noise and interference, composed by means of modulating data with the entirety of a PN sequence. Each of the even-correlation-lag generators has N outputs and generates N even-correlation lags once every sampling instant. Each of the odd-correlation-lag generators has N outputs and generates N odd-correlation lags once every sampling instant. Such an apparatus is useful for SS systems empoloying, for example, BPSK signals, QPSK signals, multicarrier BPSK signals, multicarrier QPSK signals, or CPSK signals, all having data modulation embedded therein.

DETAILED DESCRIPTION OF THE PREFERRED EMBODIMENT

Figure 1:
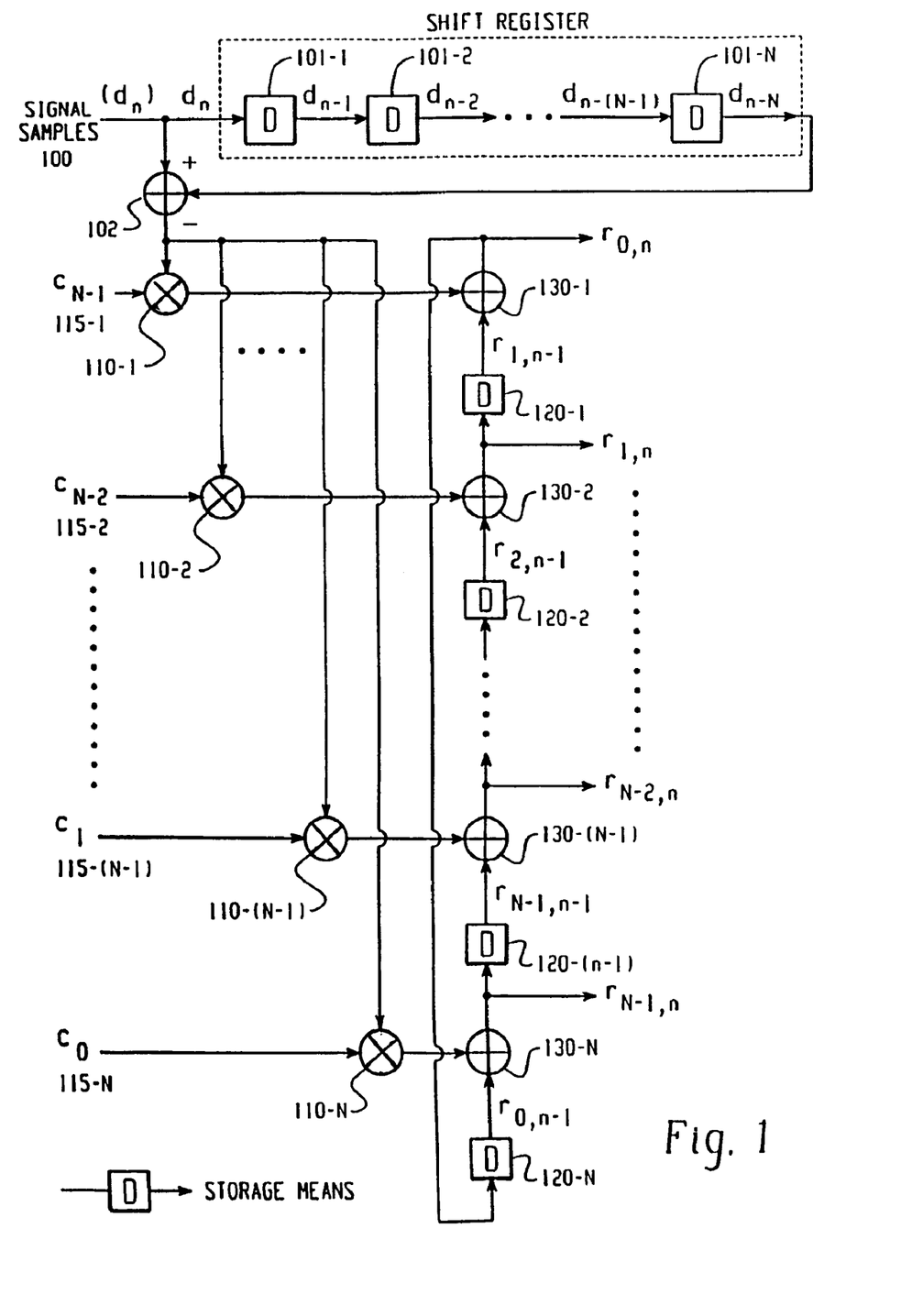
FIG. 1 is an all-lag even-correlation generator, which generates $r_n$.

A method to generate $r_n$ is based on the recursive relationship $$\begin{bmatrix} r_{0,n} \\ r_{1,n} \\ r_{2,n} \\ \vdots \\ r_{N-2,n} \\ r_{N-1,n} \end{bmatrix} = \begin{bmatrix} r_{1,n-1} \\ r_{2,n-1} \\ r_{3,n-1} \\ \vdots \\ r_{N-1,n-1} \\ r_{0,n-1} \end{bmatrix} + (d_n - d_{-N}) \begin{bmatrix} c_{N-1} \\ c_{N-2} \\ c_{N-3} \\ \vdots \\ c_1 \\ c_0 \end{bmatrix}. \qquad (9)$$

Based on knowling $r_{n-1}$, this recursive relationship can be applied to generate $r_n$. The values $r_{-N}=0$ and $d_{-N}=d_{-(N+1)}=\ldots=d_{-(2N-1)}=0$ are assigned as initial conditions. An apparatus that generates $r_n$, that is, an all-lag even-correlation generator, is shown in FIG. 1. The apparatus fm consists of a plurality of storage means 101-1, 101-2, . . . , 101-N acts as a shift register (collectively referred to as 101) for storing SS signal samples. A subtraction means 102, a plurality of multipliers 110-1, 110-2, . . . , 110-N, a plurality of storage means 120-1, 120-2, . . . , 120-N (collectively referred to as 120), and a plurality of adders 130-1, 130-2, . . . , 130-N are also included in the preferred apparatuses. The input SS signal samples are $d_{-(N-1)}$, $d_{-(N-2)}$, $d_{-(N-3)}$, . . . and the output vectors are $r_0$, $r_1$, $r_2$, . . . .

The incoming SS signal sample is fed from the port 100 to the input of shift register 101-1 and the input of subtraction means 102. The signal sample obtained at N previous sampling instances is available at the output of shift register 101-N. The outputs $r_{0,n}$, $r_{1,n}$, . . . , $r_{N-1,n}$ computed or generated at the nth sampling instant are obtained at the outputs of the adders 130-1, 130-2, . . . , 130-N, respectively. The outputs $r_{0,n-1}$, $r_{1,n-1}$, . . . , $r_{N-1,n-1}$ computed or generated at the (n−1)th sampling instant are stored in storage means 120-N, 120-1, 120-2, . . . , 120-(N−1), respectively, and are available at the outputs of respective storage means 120 at the nth sampling instant. Before $d_{-(N-1)}$ is received, the values stored in 101 and 120 are reset to zero when the reset operation sets $d_{-N}=d_{-(N+1)}=\ldots=d_{-(2N-1)}=0$ and $r_{o,-N}=r_{1,-N}=0$.

Operationally, the vector $d_n$ is fed into the apparatus. This signal sample is presented to the input of the subtraction means 102. Another input of the subtraction means 102 is connected to the output of storage means 101-N. The output of subtraction means 102 is connected to one of two inputs of multiplier 110-1, and is similarly connected to a plurality of multipliers 110-2, 110-3, . . . , 110-N. The other inputs of multipliers 110-1, 110-2, . . . , 110-N are connected to input ports 115-1, 115-2, . . . , 115-N, which provide code sequence values $c_{N-1}$, $c_{N-2}$, $c_{N-3}$, . . . , $c_0$, respectively. Outputs of multipliers 110-1, 110-2, . . . , 110-N are then connected to inputs of adders 130-1, 130-2, . . . , 130-N, respectively. Other inputs of adders 130-1, 130-2, . . . , 130-N are connected to outputs of storage means 120-1, 120-2, . . . , 120-N, respectively. Inputs of storage means 120-1, 120-2, . . . , 120-N are connected to outputs of adders 130-2, 130-3, . . . , 130-N, 130-1, respectively. Correlator outputs $r_{0,n}$, $r_{1,n}$, . . . , $r_{N-1,n}$ obtained at the nth time instant thus are provided at outputs of the adders 130-1, 130-2, . . . , 130-N, respectively.

Figure 2:
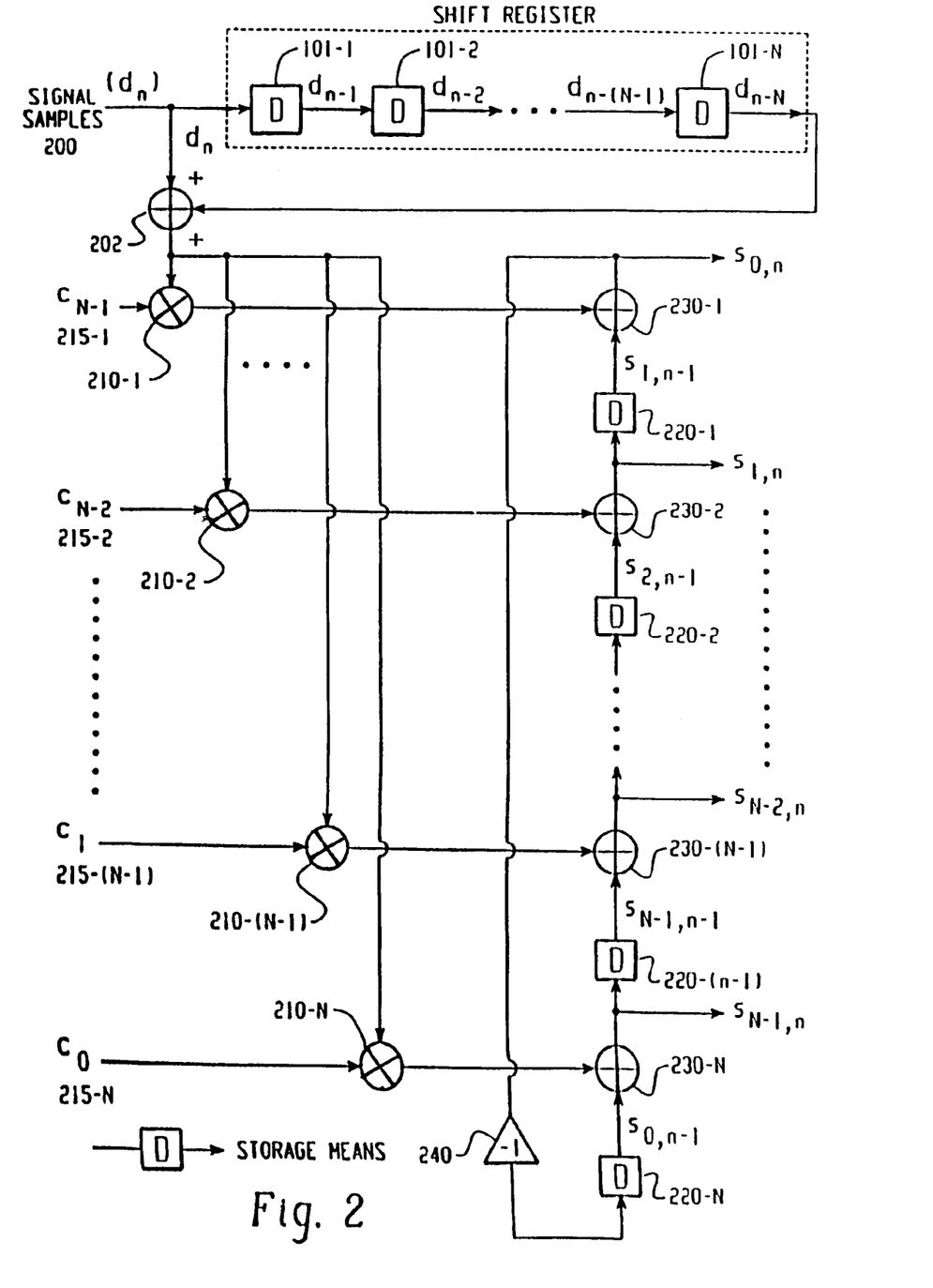
FIG. 2 is an all-lag odd-correlation generator, which generates $s_n$.

The method to generate $s_n$ is based on the recursive relationship $$\begin{bmatrix} s_{0,n} \\ s_{1,n} \\ s_{2,n} \\ \vdots \\ s_{N-2,n} \\ s_{N-1,n} \end{bmatrix} = \begin{bmatrix} s_{1,n-1} \\ s_{2,n-1} \\ s_{3,n-1} \\ \vdots \\ s_{N-1,n-1} \\ s_{0,n-1} \end{bmatrix} + (d_n - d_{n-N}) \begin{bmatrix} c_{N-1} \\ c_{N-2} \\ c_{N-3} \\ \vdots \\ c_1 \\ c_0 \end{bmatrix}. \qquad (10)$$

Based on knowing $s_{n-1}$, this recursive relationship can be applied to generate $s_n$. The values $s_{-N}=0$ and $d_{-N}=d_{-(N+1)}=\ldots=d_{-(2N-1)}=0$ are set as initial conditions. An apparatus that generates $s_n$, that is, an all-lag odd-correlation generator, is shown in FIG. 2. The apparatus consists of an addition means 202, a plurality of multipliers 210-1, 210-2, . . . , 210-N, a plurality of storage means 220-1, 220-2, . . . , 220-N (collectively referred to as 220), a negator 240, and a plurality of adders 230-1, 230-2, . . . , 230-N. Since the generation of $s_n$ is always accompanied with the generation of $r_n$, the signal sample obtained at the N previous sampling instances can be obtained from the output of shift register 101, the shift register 101 being in an apparatus that generates $r_n$. The input SS signal samples are $d_{-(N-1)}$, $d_{-(N-2)}$, $d_{-(N-3)}$, . . . and the output vectors are $s_0$, $s_1$, $s_2$, . . . .

The incoming SS signal sample is fed from the port 200 to the input of addition means 202. The signal sample obtained at N previous sampling instant is available at the output of shift register 101-N. The outputs $s_{0,n}$, $s_{1,n}$, . . . , $s_{N-1,n}$, computed or generated at the nth sampling instant are obtained at the outputs of adders 230-1, 230-2, . . . , 230-N, respectively. The outputs $-s_{0,n-}$, $s_{1,n-1}$, $s_{2,n-1}$, . . . , $s_{N-1,n-1}$ computed or generated at the (n−1)th sampling instant are stored in storage means 220-N, 220-1, 220-2, . . . , 220-(N−

1), respectively, and are available at the outputs of respective storage means 220 at the n th sampling instant. The value $-s_{0,n-1}$ is obtained from $s_{0,n-1}$ by a negator 240. Before $d_{-(N-1)}$ is received, the values stored in 220 are reset to zero. When $d_{-(N-1)}$ is received, the reset operation effectively sets $d_{-N} = d_{-(N+1)} = \ldots = d_{-(2N-1)} = 0$ and $s_{0,-N} = s_{1,-N} = \ldots = s_{N-1,-N} = 0$.

Operationally, the vector $d_n$ is fed into the apparatus. This signal sample is presented to the input of addition means 202. Another input of addition means 202 is connected to the output of shift register 101-N. The output of addition means 202 is connected to one of two inputs of multiplier 210-1, and is similarly connected to a plurality of multipliers 210-2, 210-3, ..., 210-N. Other inputs of multipliers 210-1, 210-2, ..., 210-N are connected to input ports 215-1, 215-2, ..., 215-N, which provide code sequence values $c_{N-1}, c_{N-2}, c_{N-3}, \ldots c_0$, respectively. Outputs of multipliers 210-1, 210-2, ..., 210-N are connected to inputs of adders 230-1, 230-2, ..., 230-N, respectively. Other inputs of adders 230-1, 230-2, ..., 230-N are connected to outputs of storage means 220-1, 220-2, ..., 220-N, respectively. Inputs of storage means 220-1, 220-2, ..., 220-(N-1) are connected to outputs of adders 230-2, 230-3, ..., 230-N, respectively. The input of storage means 225N is connected to the output of negator 240. The input of the negator 240 is connected to output of adder 230-1. Correlator outputs $s_{0,n}$, $s_{1,n}, \ldots, s_{N-1,n}$ obtained at the nth time instant thus are provided at outputs of the adders 230-1, 230-2, ..., 230-N, respectively.

Figure 3:
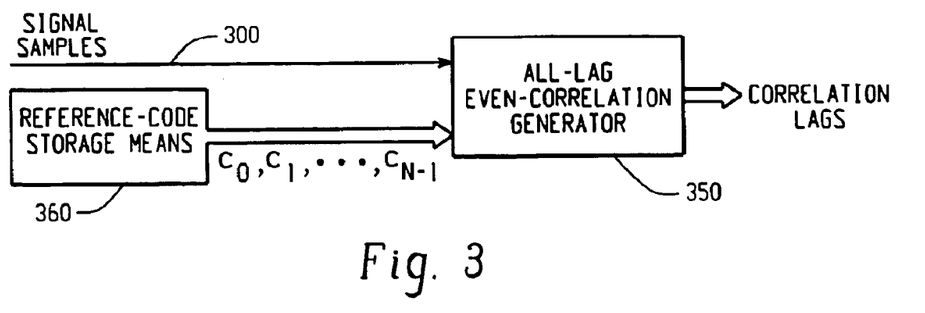
FIG. 3 shows an all-lag correlator for correlating a stream of SS signal samples with a reference code.

An apparatus that accomplishes the first object of the invention is shown in FIG. 3, and includes an all-lag even-correlation generator 350, and a reference-code storage means 360. A stream of SS signal samples is fed into the apparatus from port 300. Correlation lags for the stream of SS signal samples are obtained as outputs of the all-lag even-correlation generator 350. The reference-code storage means 360 provide code sequence values $c_0, c_1, \ldots, c_{N-1}$ to the all-lag even-correlation generator 350.

Figure 4:
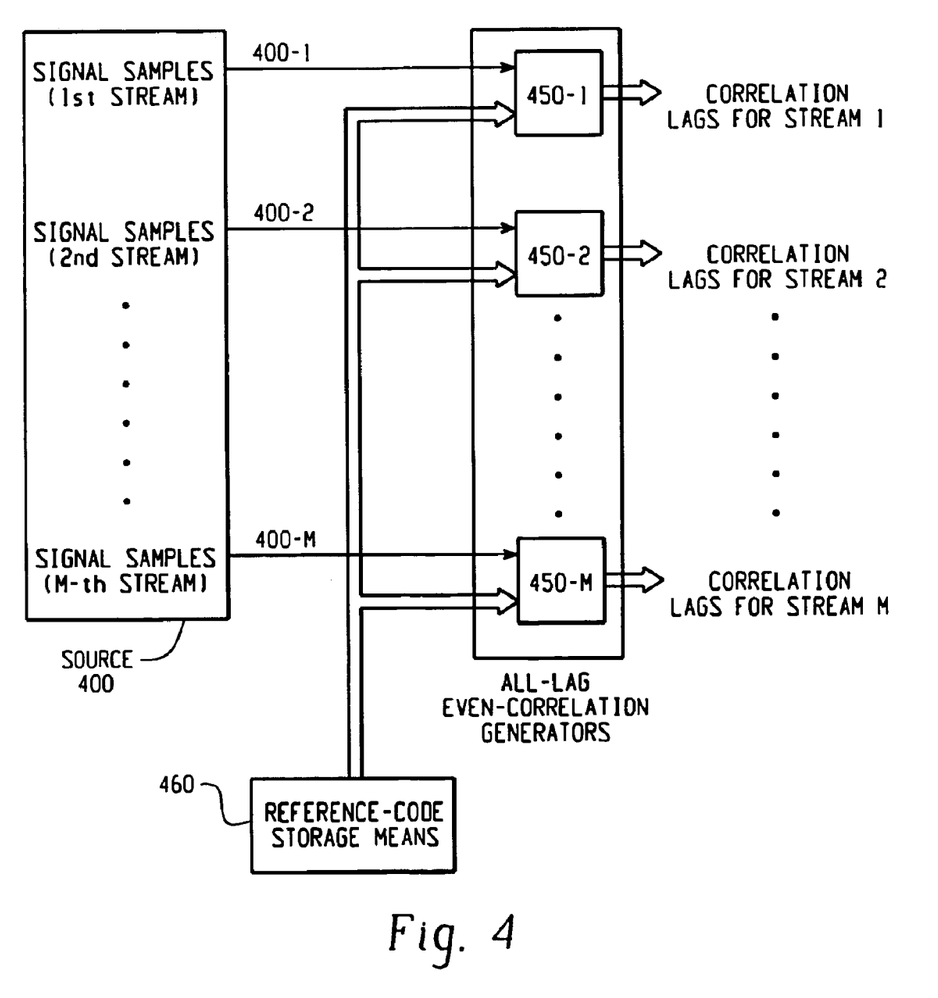
FIG. 4 shows an all-lag correlator for correlating a plurality of streams of SS signal samples with a reference code.

An apparatus that accomplishes the second object of the invention is shown in FIG. 4, and includes a plurality of all-lag even-correlation generators 450-1, 450-2, ..., 450-M (collectively referred to as 450), and a reference-code storage means 460. M is the number of streams of SS signal samples to be correlated with a reference code. The M streams of SS signal samples are fed into the apparatus through ports 400-1, 400-2, ..., 400-M (collectively referred to as 400). Correlation lags for all streams are obtained as outputs of all-lag even-correlation generators 450-1, 450-2, ..., 450-M. The reference-code storage means 460 provide code sequence values $c_0, c_1, c_{N-1}$ to the M all-lag even-correlation generators 450.

Figure 5:
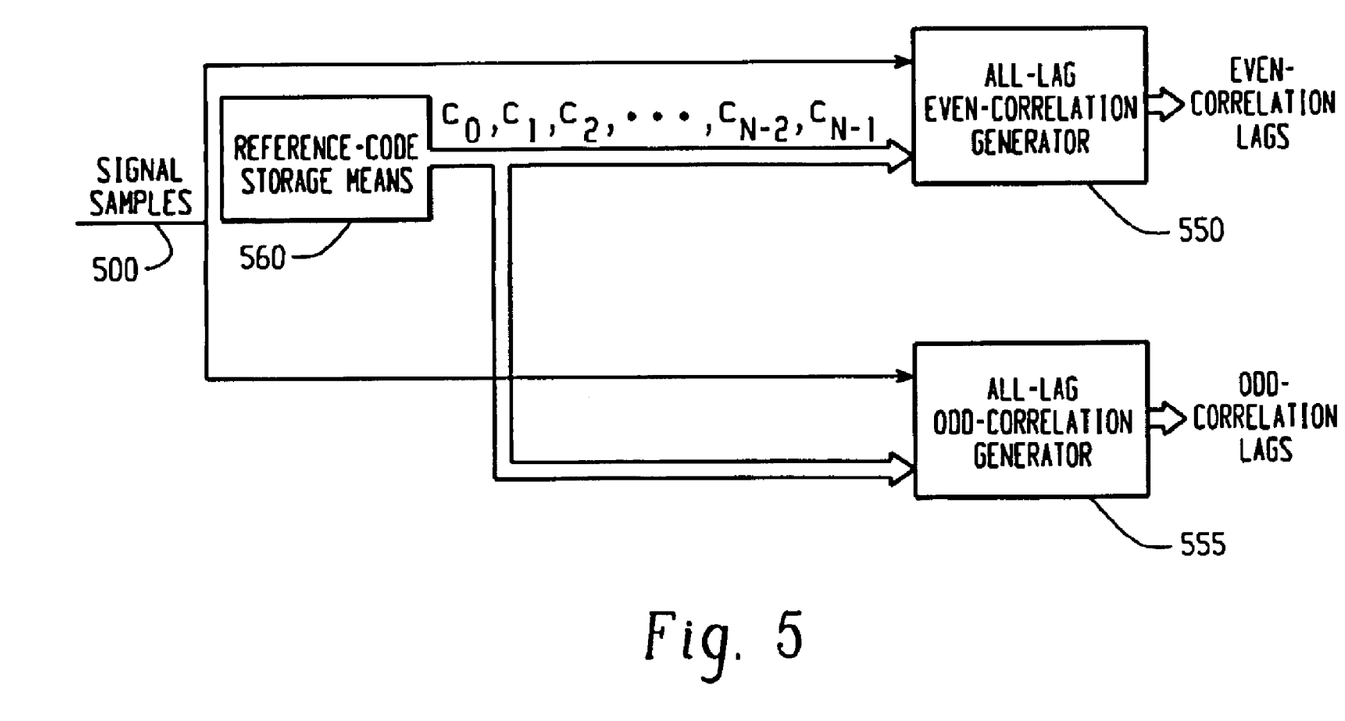
FIG. 5 shows an all-lag correlator for correlating a stream of SS signal samples with a reference code.

An apparatus that accomplishes the third object of the invention is shown in FIG. 5, and includes an all-lag even-correlation generator 550, an all-lag odd-correlation generator 555, and a reference-code storage means 560. A stream of SS signal samples is fed into the apparatus from port 500, and is directed to the all-lag even- and odd-correlation generators 550 and 555. Even-correlation lags for the stream of SS signal samples are obtained as outputs of the all-lag even-correlation generator 550. Odd-correlation lags for the stream of SS signal samples are obtained as outputs of the all-lag odd-correlation generator 555. The reference-code storage means 560 provide code sequence values $c_0, c_1, \ldots, c_{N-1}$ to the all-lag even-correlation generator 550 and the all-lag odd-correlation generator 555.

Figure 6:
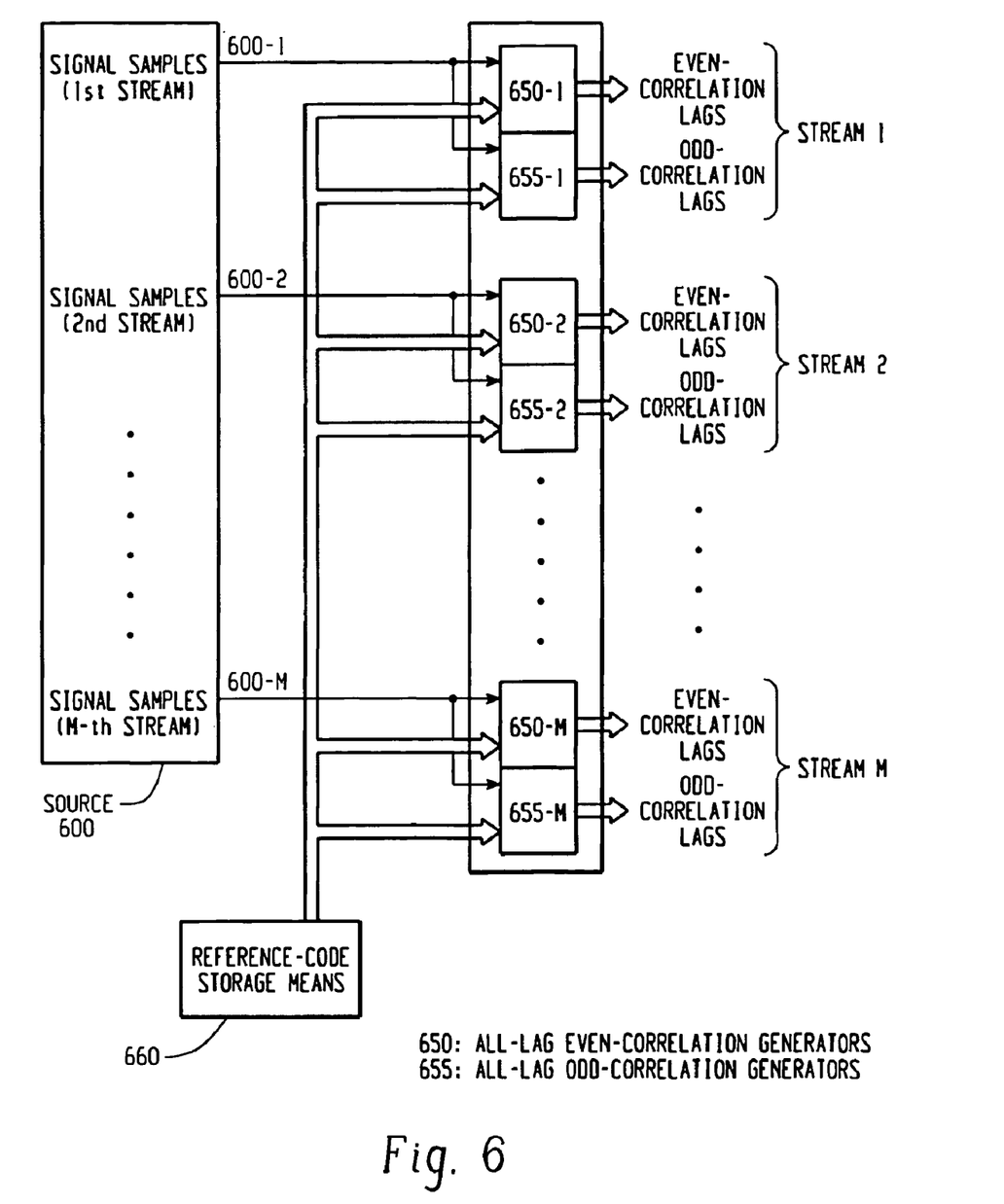
FIG. 6 shows an all-lag correlator for correlating a plurality of streams of SS signal samples with a reference code.

An apparatus that accomplishes the fourth object of the invention is shown in FIG. 6, and includes a plurality of all-lag even-correlation generators 650-1, 650-2, ..., 650-M (collectively referred to as 650), a plurality of all-lag odd-correlation generators 655-1, 655-2, ..., 655-M (collectively referred to as 655), and a reference-code storage means 660. M is the number of streams of SS signal samples to be correlated with a reference code. The M streams of SS signal samples are fed into the apparatus through ports 600-1, 600-2, ..., 600-M (collectively referred to as 600). Even-correlation lags for all streams are obtained as outputs of all-lag even-correlation generators 650-1, 650-2, ..., 650-M. Odd-correlation lags for all streams are obtained as outputs of all-lag odd-correlation generators 655-1, 655-2, ..., 655-M. The reference-code storage means 660 provide code sequence values $c_0, c_1, \ldots, C_{N-1}$ to the M all-lag even-correlation generators 650 and the M all-lag odd-correlation generators 655.

It will be apparent to those skilled in the art that various modifications may be made to the apparatus described herein without departing from the scope and spirit of the invention. For example, the apparatus described herein may be used in a particular application, but may discard some of the outputs produced by an all-lag correlator, or may not use some/all outputs produced at some sampling instance. Furthermore, it will be apparent to those skilled in the art that the apparatus described herein can be implemented not only in the digital domain (i.e., using very large scale integration circuits to process the incoming SS signal that is digitized using an analog-to-digital converter) but also in the analog domain (viz., via using surface-acoustic-wave devices, charge-coupled devices or other equivalents) and also in software for execution in digital signal processor(s) or programmable device(s) or their equivalents.

We claim:

1. An apparatus for correlating a spread-spectrum signal sample with a reference code, comprising:

spread spectrum signal storage means for storing the spread-spectrum signal sample at a present sampling instance and at a previous sampling instance;

subtraction means for calculating a difference between the present sampling instance and the previous sampling instance;

multiplication means for computing the multiplication result of the difference calculated by the subtraction means and an element of the reference code;

correlation lag storage means for storing a correlation lag obtained at the last previous sampling instance; and addition means, coupled to the outputs of the multiplication means and the correlation lag storage means;

wherein the addition means generates a correlation lag for the present sampling instance based on the correlation lag at the last previous sampling instance.

2. The apparatus of claim 1, wherein the spread-spectrum signal sample is generated from a received BPSK signal composed by means of periodic repetition of a PN sequence.

3. The apparatus of claim 1, wherein the spread-spectrum signal sample is generated from a received CPSK signal composed by means of periodic repetition of a PN sequence.

4. The apparatus of claim 1, wherein the correlation lag for the present sampling instance is an even-correlation lag.

5. The apparatus of claim 1, further including a negator configured to generate odd correlation lags.

6. An apparatus for correlating a plurality of streams of a spread-spectrum signal sample with a reference code, comprising:

spread spectrum signal storage means for storing the spread-spectrum signal sample at a present sampling instance and at a previous sampling instance for each stream;

subtraction means for calculating a difference between the present sampling instance and the previous sampling instance for each stream;

multiplication means computing the multiplication result of the difference calculated by the subtraction means and an element of the reference code for each stream, the element of the reference code for each stream being the same element;

correlation lag storage means for storing a correlation lag obtained at the last previous sampling instance for each stream; and addition means, coupled to the output of the multiplication means and the correlation lag storage means;

wherein the addition means generates a correlation lag for the present sampling instance based on the correlation lag at the last previous sampling instance.

7. An apparatus of claim 6, wherein the plurality of streams of the spread-spectrum signal sample is generated from a BPSK signal composed by means of periodic repetition of a PN sequence.

8. An apparatus of claim 6, wherein the plurality of streams of the spread-spectrum signal sample is generated from a CPSK signal composed by means of periodic repetition of a PN sequence.

9. An apparatus of claim 6, wherein the plurality of streams of the spread-spectrum signal sample is generated from a QPSK signal composed by means of periodic repetition of a PN sequence.

10. An apparatus of claim 6, wherein the plurality of streams of the spread-spectrum signal sample is generated from a multicarrier BPSK signal being composed by means of periodic repetition of a PN sequence.

11. An apparatus of claim 6, wherein the plurality of streams of the spread-spectrum signal sample is generated from a multicarrier QPSK signal being composed by means of periodic repetition of a PN sequence.

* * * * *